United States Patent [19]

Ito

[11] Patent Number: 5,339,267
[45] Date of Patent: Aug. 16, 1994

[54] PREPROCESSOR OF DIVISION DEVICE EMPLOYING HIGH RADIX DIVISION SYSTEM

[75] Inventor: Eiki Ito, Kawasaki, Japan

[73] Assignee: Fujitsu Limited, Kawasaki, Japan

[21] Appl. No.: 71,341

[22] Filed: Jun. 2, 1993

Related U.S. Application Data

[63] Continuation of Ser. No. 854,098, Mar. 19, 1992, abandoned.

[30] Foreign Application Priority Data

Mar. 19, 1991 [JP] Japan ................... 3-078265

[51] Int. Cl.$^5$ ........................ G06F 7/52; G06F 7/38
[52] U.S. Cl. ................... 364/761; 364/715.04
[58] Field of Search ............ 364/761, 715.04, 715.09, 364/764, 767

[56] References Cited

U.S. PATENT DOCUMENTS 4,722,069  1/1988  Masayuki ..................... 364/767
5,153,851  10/1992  Kanazawa et al. ............ 364/715.04

OTHER PUBLICATIONS

Carter, et al., "Radix-16 Signed-Digit Division", *IEEE Transactions on Computers*, pp. 1424-1433, Dec. 1990, vol. 39, No. 12.

Maass, K., "Alignment of Operands Before and Afte 2-Bit Binary Divide Loop", *IBM Technical Disclosure Bulletin*, pp. 249-151, Jun. 1980, vol. 23, No. 1.

*Primary Examiner*—Long T. Nguyen
*Attorney, Agent, or Firm*—Staas & Halsey

[57] ABSTRACT

A preprocessor of a division device employing a high radix division system includes a first zero counter, a first shifter, a second counter, a latch, and a second shifter. From among continued "0" bits at the heads of a divisor and a dividend, the number of units of continued "0" bits are counted by the first zero counter using "n" bits as a unit. The divisor and the dividend are shifted by "the unit number"×"n bits" by the first shifter using "n" bits as a unit. Concurrently, the divisor shifted by the first shifter is counted for the remaining number of head expression "0" bits by the second zero counter, and the divisor is normalized by the second shifter for obtaining the head bit "1". The dividend is shifted by the second shifter by the number of the head expression "0" bits of the divisor of the second zero counter stored by a latch, namely, by the shift number of the divisor. Thus, the difference between the shift numbers of the divisor and the dividend is always equal to an integer multiple of "n". The digit number of a quotient is also equal to an integer multiple of "n", the division can terminate at a predetermined digit, and a required remainder can be obtained simultaneously with the quotient.

5 Claims, 5 Drawing Sheets

PREPROCESSOR OF DIVISION DEVICE EMPLOYING HIGH RADIX DIVISION SYSTEM

This application is a continuation, of application Ser. No. 07/854,098, filed Mar. 19, 1992, now abandoned.

BACKGROUND OF THE INVENTION

1) Field of the Invention

The present invention relates to a preprocessor of a division device, and in particular, to a preprocessor of a division device employing a high radix division system capable of producing a partial quotient of "n" bits ($n \geq 2$) at a time (i.e., in a single processing step).

2) Description of the Related Art

A division operation is largely classified into three processes, namely: preprocess, main process, and post-process. The preprocess is used to modify operand data into a form such that the main processor accepts the operand data, and the main process actually produces the quotient and a remainder. The postprocess modified the output of the main processor to produce a specified form of the main processor output, which is suitable as a result of the division output.

The preprocess of the division device has various forms, depending on the system of the main process. The most widely known system of the main process is a means such that one bit of a partial quotient is obtained by subtracting a divisor from a partial remainder, the result of such subtraction or the original partial remainder is shifted by one bit, and the resultant value is made a new partial remainder (hereinafter referred to as a "one-bit system"). The high radix division system is used to produce an n-bit partial quotient by a one time a processing (i.e., a single processing step), in comparison with the one-bit system.

The one-bit system performs a normalization shift, as a preprocess, to produce a significant bit of "1" both for a divisor and a dividend. Such a processing step is carried out by a preprocessor.

In the preprocessor of the division device as hereinbefore described, a drawback often arises when a high radix division requires both a quotient and a remainder at the same time. This is because an enumeration for obtaining a quotient must be stopped at the predetermined digit to leave a reminder, but such a predetermined digit is often not the last digit of a group of "n" digits.

Such a problem arises in the high radix division and therefore, conventionally, a dividend shift is performed after amending a micro program to make the bit number of the quotient, to be obtained, an integer multiple of "n".

However, such an amendment by the micro-program requires multiple machine cycles for the processing and, therefore, results in the deterioration in the performance of a division operation.

SUMMARY OF THE INVENTION

An object of the present invention is to provide a preprocessor of a division device capable of preprocessing a high radix division at a high speed.

According to the present invention, from among leading, continuous "0" bits of each of a divisor and a dividend, the number of units of such leading, continuous "0" bits are counted by the first zero counter using "n" bits as a unit. The divisor and the dividend are shifted by (the unit number)$\times$("n" bits) by the first shifter, using "n" bits as a unit. The divisor, as thus shifted by the first shifter, is again processed, for counting the remaining number of leading "0" bits, i.e., the "0s" at the head or beginning thereof (hereinafter also referred to as head expression "0" bits) by the second zero counter, and the divisor is normalized by the second shifter such that the second-shifted, normalized divisor has "1" lead, or head, bit. The dividend then is shifted by the second shifter, by the number of the head expression "0" bits of the divisor, as determined by the second zero counter and stored by a latch, namely, by the shift number of the divisor. Thus, the difference between the shift numbers of the divisor and the dividend is always equal to an integer multiple of "n". The digit number of the quotient is also equal to an integer multiple of "n". Accordingly, the division can terminate at a predetermined digit position, and a required remainder can be obtained simultaneously with the quotient.

BRIEF DESCRIPTION OF THE DRAWINGS

The present invention will be more clearly understood from the description as set forth below with reference to the accompanying drawings wherein:

FIG. 2 shows an operation of the conventional preprocessor of the division device;

FIG. 3 shows an operation of the conventional preprocessor of the division device;

FIG. 4 shows an operation of the conventional preprocessor of the division device;

FIG. 7 shows an operation of a preprocessor of a division device according to the present invention; and FIG. 8 shows an operation of a preprocessor of a division device according to the present invention.

DESCRIPTION OF THE PREFERRED EMBODIMENTS

Before describing the preferred embodiments, an explanation will be given of the conventional preprocessor of a division device, with reference to FIG. 1.

Figure 1:
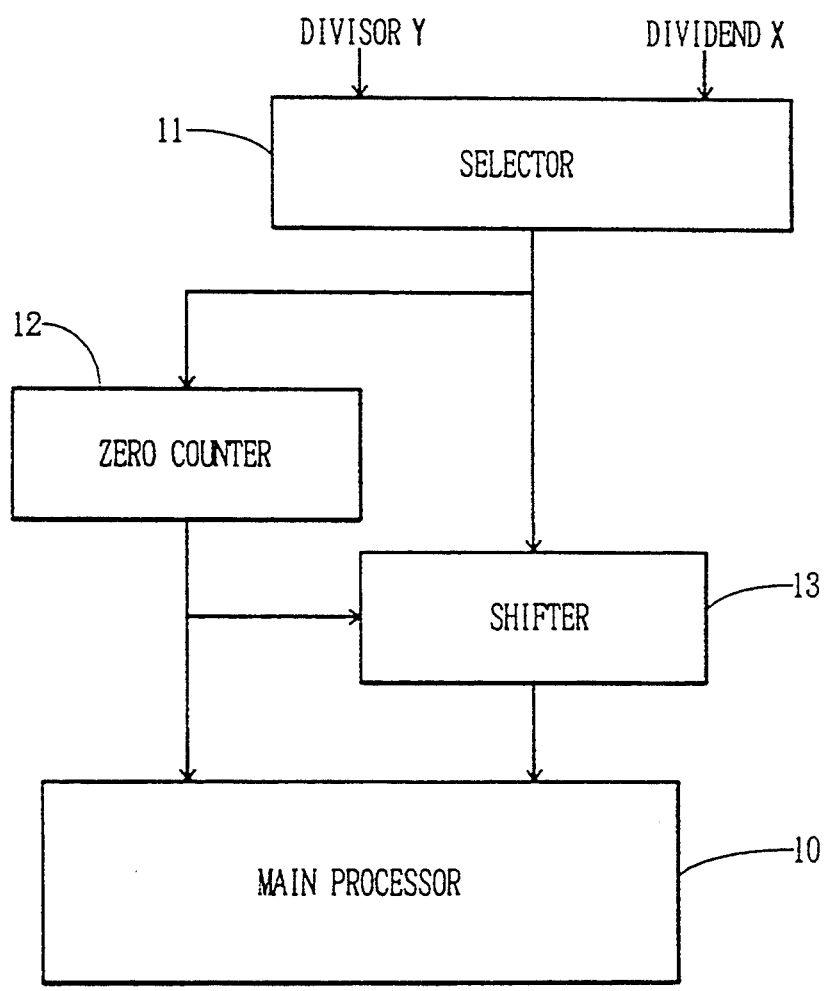
FIG. 1 is a schematic block diagram explaining a conventional preprocessor of the division device.

FIG. 1 is a schematic block diagram explaining a conventional preprocessor of the division device of a one bit system.

The one-bit system performs a normalization shift, as a preprocess to produce a most significant bit of "1" for both a divisor and a dividend.

Such a processing step is carried out by a preprocessor as shown in FIG. 1. The preprocessor comprises a selector 11 for selecting a divisor or a dividend to be input, a zero counter 12 for counting the number of "0" (zero) binary digits at the beginning of the selected one of the divisor and dividend, and a shifter 13 for shifting same by the number of zero bits, obtained by such counting, to produce the selected binary number with the most significant bit of "1". Producing the most significant bit of "1" is called normalization. The preprocessor outputs the thus normalized, selected divisor or dividend, based on the number of beginning, or leading, "0" bits, as measured by the zero counter 12, and as correspondingly shifted by the shifter 13, and the normalized divisor and dividend are sent to the main processor 10.

In such a process, "0111÷+"0011" can be computed, for example, by the following procedure. The divisor Y=0011 is normalized to produce "1100" and the dividend X=0111 is normalized to produce "1110". At this time, assume that the shift amount (=sa) of Y and X are say and saX, and saY=2 and saX=1 is produced, since the divisor Y=0011 is shifted by two bits to "1100" and the dividend X=0111 is shifted by one bit to "1110".

In the main processor, in FIG. 2, if a division is performed as a binary digit integer and a left bit of a dividend X is the 0th bit, then a quotient is produced only from the third bit (saY−saX+1), thus producing, in this example, only 2 bits. Further (3−saY+saX) positions of "0s", in this example two "0s", are inserted to the left of the third bit, thus leaving a quotient "0010".

A remainder starts at the (−saX)-th bit, and in this example "0001" corresponding to as much as 4 bits from the (−1)-the bit is left as the remainder.

In the preprocessor of the division device as hereinbefore described, a drawback often arises when a high radix division requires both a quotient and a remainder at the same time, because an enumeration for obtaining a quotient must be rounded up at a predetermined digit thereby to leave a remainder, but such a predetermined digit is often not the last digit of a group of "n" digits.

An example of such a drawback is shown in FIG. 3, where 1011÷0011 is computed, by using the high radix system capable of producing two quotient bits at a time. If the process of producing quotient bits is started at the third bit, (saY−saX+1)=2−0+1=3 is the number of bits to be produced and it is desired to attain only the fifth bit after obtaining the third and fourth bits at the same time by the high radix system. If simultaneously attaining the fifth and sixth bits, the quotient of the sixth bit is established. To obtain only a quotient, a rounding down of the sixth bit is preferred, but, to obtain a remainder, an amendment is required, because of an excessively high minus, of as much as the quotient of the sixth bit, thereafter.

This example is satisfactorily processed when a quotient is attained from the second bit; however, upon computing 1011÷0110, as shown in FIG. 4, the enumerating for the quotient is processed up to the fifth bit when, instead, the enumeration is intended to stop at the fourth bit.

Such a problem arises in the high radix division and therefore, conventionally, a dividend shift is performed after amending a micro program to attain "n" as the bit number of the quotient to be obtained.

However, such an amendment by the micro-program requires multiple machine cycles for the processing and, therefore, results in the deterioration of the division function characteristics.

Figure 5:
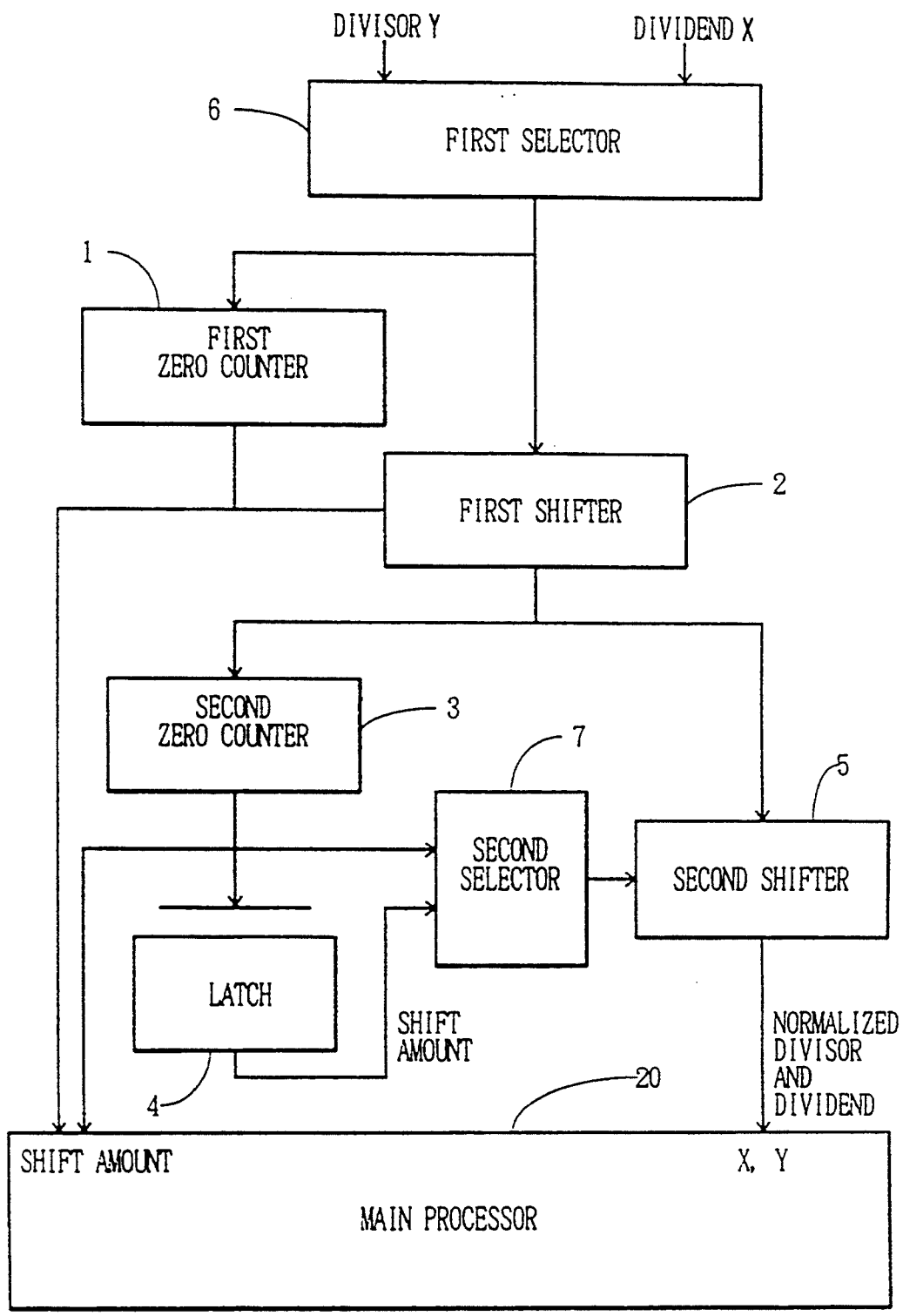
FIG. 5 is a block diagram showing an embodiment of a preprocessor of a division device according to the present invention.

An embodiment of a preprocessor of a division device in accordance with the present invention is described with reference to the drawings of FIGS. 5 to 8, which show an embodiment of a preprocessor of a division device in accordance with the invention. In the present embodiment, a preprocessor of a division device comprises, as shown in FIG. 5, a first selector 6 for selecting either a divisor Y or a dividend X to be input; a first zero counter 1 for counting the unit number of continued "0" bits, using "n" bits as a unit, from among the continued "0" bits at the head (i.e., leading zero bits) of the selected one of the divisor and the dividend which is input; a first shifter 2 for shifting the selected one of the divisor and the dividend by a "n" bit unit, based on the above counted value; a second zero counter 3 for counting the number of the head, or leading, "0" bits of the divisor, after completion of the first normalization, (hereinafter referred to as "bsaY", standing for the bit shift amount of Y); a latch 4 for storing the count value of the zero counter 3; a second selector 7 for selectively outputting the count output of the second zero counter 3 or the output of the latch 4; and a second shifter 5 for receiving the output of the second selector 7 and executing both a shift of the divisor, by less than "n" bits, and also a shift of the dividend, by the number stored by the latch 4. The preprocessor of the division device is used to output the normalized dividend X and the normalized divisor Y and the respective shift numbers.

Therefore, according to the embodiment, for example, when computing the high radix division with a radix 3 for 000 010 111 010÷000 000 001 001, the first selector 6 selects the divisor 000 000 001 001 and supplies it to the first zero counter 1. The first zero counter 1 counts the unit number of leading "0" bits by using n=3 as a unit (hereinafter referred to as "nsaY", standing for n-bit shift amount of Y), and obtains the shift unit value nsaY=2 to be supplied to the first shifter 2.

Similarly, the number of groups of three continuous "0s" (i.e., bits "000") is counted; when inputting 000 000 001 111, nsaY=2.

The first shifter 2 shifts the divisor by (n×nsaY) bits, i.e., by 3×2=6 bits, and produces the output 001 001 000 000 which is supplied to the second zero counter 3. The second zero counter counts the number of the leading "0" bits of the divisor, as shifted and output by the first shifter, obtaining the shift number bsaY=2 for this example, and outputs the number 2 to the latch 4 and the second shifter 5. The second shifter 5 accordingly performs a 2-bit shift of the "first-shifted" divisor, and outputs the resultant, twice-shifted and thus normalized divisor 100 100 000 000 and the shift (3 bit unit) number nsaY=2 of the first shift and the shift (single bit unit), number bsaY=2 of the second shift.

To normalize the dividend, the first selector 6 selects the dividend, 000 010 111 010, as the input to the first zero counter 1. The first zero counter 1 counts the shift unit number using n=3 as a unit to obtain the shift unit number nsaX=1, and supplies the latter to the first shifter 2. Then, the first shifter 2 shifts the dividend by 3 bits to obtain 010 111 010 000, and supplies the first-shifted dividend to the second zero counter 3. At this time, the second selector 7 accesses the latch 4 to select and receive therefrom the latched shift number bsaY=2, and supplies same to the second shifter 5. The second shifter 5 performs a 2-bit shift thereon, thereby to output the relatively normalized dividend 01 011 101 000 000 and the shift unit number nsaX=1.

As hereinbefore described and according to the present embodiment, the difference between the shift numbers of the normalized divisor and the relatively normalized dividend is 8−5=3, which is a multiple of 3. This relationship is always established, the bit number of the quotient produced is a multiple of 3, and the division is stopped at the predetermined digit to thus obtain an exact remainder.

In more detail, the divisor is shifted by (3×nsaY+bsaY) bits, the dividend is shifted by (3×nsaX+bsaY) bits and, thus, the difference between the shift numbers is $(3 \times nsaY+bsaY)-(3 \times nsaX+bsaY)=3(nsaY-nsaX)$, thereby resulting in a multiple of radix n=3 in the present example.

An example of the division device using the preprocessor according to the present embodiment is now described. The preprocessor is the same as described above, and the explanation thereof is hereinafter omitted.

Figure 6:
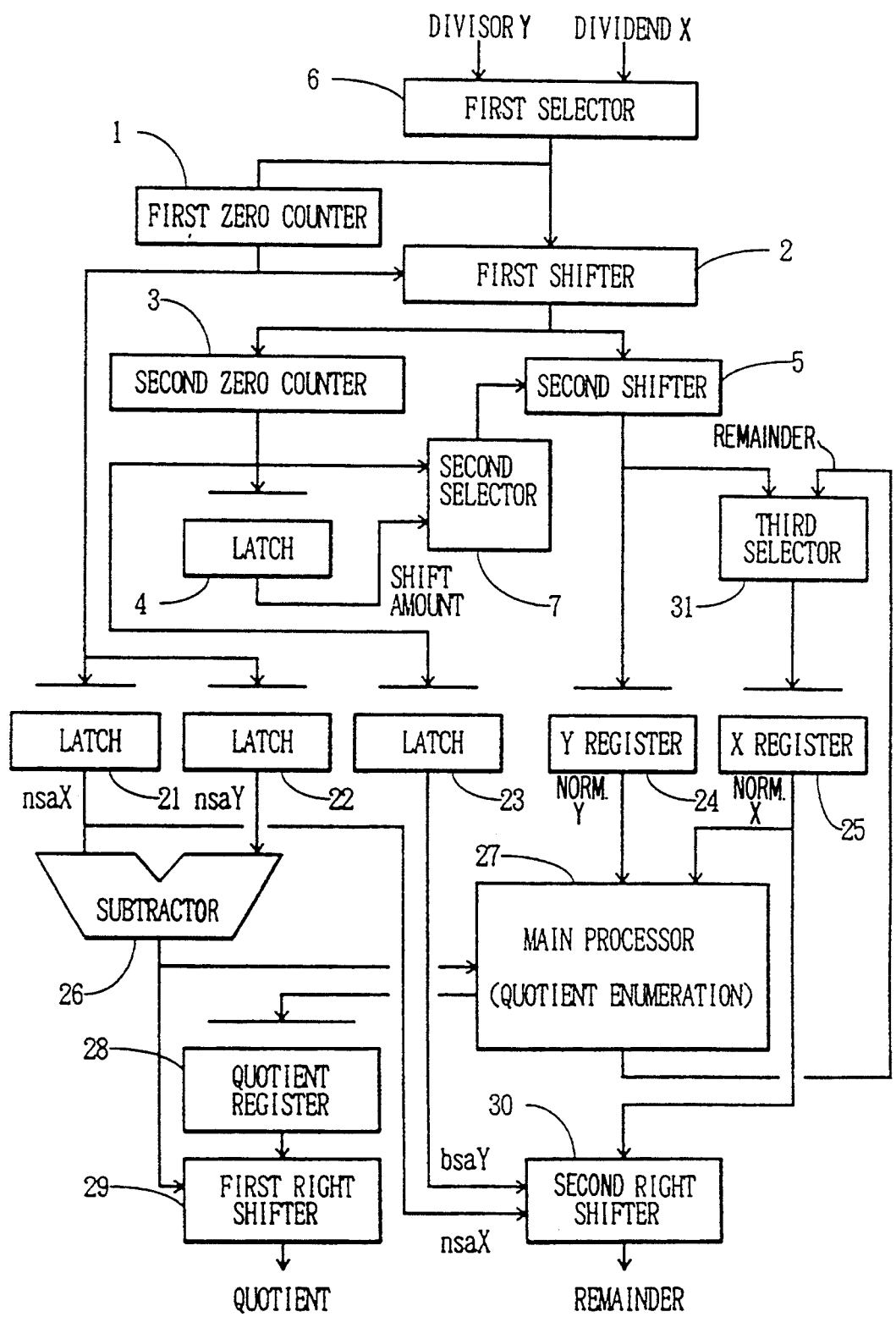
FIG. 6 is a block diagram showing a division device using a preprocessor of FIG. 1 according to the present invention.

FIG. 6 shows a division device using the preprocessor of the invention. In the drawings, reference numeral 21 depicts a latch for storing a first shift amount nsaX of the dividend counted by the first zero counter 1; 22 depicts another latch for storing the first shift amount nsaY of the divisor; 23 depicts still another latch for storing the second shift number bsaY of the dividend; 24 depicts a Y register for storing the normalized divisor (normY); 25 depicts an X register for storing the normalized dividend; 26 depicts a subtracter for computing nsaX−nsaY; 27 depicts a main processor for enumerating a quotient and a remainder; 28 depicts a quotient register for storing the quotient enumerated by the main processor 27; 29 depicts a right shifter for right-shifting a quotient stored in the quotient register based on the value of the subtracter 26; 30 depicts a second right shifter for right-shifting a remainder stored in the X register based on the values of nsaX and bsaY; and 31 depicts a third selector for storing the remainder, computed by the main processor, to the X register.

The change of the normalized divisor in the process of division is explained in detail is U.S. Pat. No. 4,722,069.

When the latches 21, 22, 23 and the registers 24, 25 store nsaX, nsaY, bsaY, normX, and normY, the number of repeating times, nsaX−nsaY+1, for the quotient enumeration is determined by the computation nsaY−nsaX performed by the subtracter 26. According to this process, the main processor performs the computation to obtain the quotient and an intermediate remainder, on a processing basis. The quotient and the remainder are respectively stored in the quotient register 28 and the X register 25; more specifically after completion of the completion process a predetermined number of times, the quotient is stored in the quotient register 28 and the remainder is stored in the X register 25.

Since the quotient and remainder correspond to the normalized dividend and divisor, then by the respective right shifters 29 and 30, and actual quotient and the actual remainder are obtained, respectively, by right-shifting the quotient by $[n \times (nsaX-nsaY)+p]$ bits and by right-shifting the remainder by $(n \times nsaX+nsaY+q)$ bits, where "p" and "q" are constants which are determined, depending on the scaling of the divisor and the dividend and other conditions.

A practical computation is described, assuming n=2. Producing quotient bits starts at the second bit. In FIG. 7, when computing 1011÷0011, the divisor's first shift number is nsaY=1, the dividend's first shift number is nsaX=0, and the divisor's second shift number is bsaY=0; accordingly, the number of the operational times nsaY−nsaX+1 is equal to 2, the quotient is 0011, and the remainder is 0010.

Similarly, in FIG. 8, when computing 1011÷0110, the divisor's first shift number is nsaY=0, the dividend's first shift number is nsaX=0 and the dividend's second shift number is bsaY, then the number of the operational times nsaY−nsaX+1 is equal to 1, the quotient is 0001, and the remainder is 0101.

According to the embodiment, the difference between the shift numbers of the divisor and the dividend is always an integer multiple of "n"; the digit number of the quotient is also an integer multiple of "n"; the division may be stopped at the predetermined digit, and a desired reminder is obtained simultaneously with a quotient.

Note that the shift value may be different if a bit position of a shift register, in which a dividend is stored, is different, but the substantial shift amount is the same when the bit position of the shift register is fixed, for example, when a left bit of a dividend X is the 0th bit.

As hereinbefore described, in accordance with the present invention, the number of the leading (or head expression) "0" bits of each of a divisor and a dividend is determined by a first zero counter, using "n" bits as a unit, and each thereof is shifted by the first shifter by a unit of "n" bits. Concurrently, for the first-shifted divisor (i.e., as shifted by the first shifter), the number of remaining, leading (or head expression) "0" bits thereof is counted by the second zero counter, and the first-shifted divisor is again shifted and thus normalized by the second shifter, by the count of the second zero counter, such that th second-shifted divisor has a lead bit of "1"; the dividend also is shifted by the second shifter, by the number of the leading (or head expression) "0" bits of the divisor, as counted by the second zero counted and stored by the latch, namely, by the shift number of the divisor. Thus, the difference between the shift numbers of the divisor and the dividend is always equal to an integer multiple of "n", the digit number of the quotient is also equal to an integer multiple of "n"; the division can be terminated at a predetermined digit, and a required remainder can be obtained simultaneously with the quotient. Since the preprocessor of the division device is realized by hardware, the division process can be executed at high speed and thus affords an improvement of the operating speed of a computer used for such division operations.

What is claimed is:

1. A division device preprocessor for preprocessing a divisor and a dividend to be subjected to high radix division capable of producing a partial quotient of "n" bits (n≧2) at one time, the divisor and the dividend each being expressed as a binary number of plural successive bits in corresponding, plural successive bit positions, each bit having either a "0" or a "1" bit value, and thus each including binary numbers having a number of leading bit positions including one or more bit positions in which the corresponding, leading successive bits have continuous "0" bit values, comprising:

means for normalizing the input divisor and producing a normalized divisor and for normalizing the input dividend relatively to the normalized divisor and producing a relatively normalized dividend, the normalizing means shifting the plural successive bits, of the corresponding successive bit positions, of the input divisor to respective and higher, corresponding bit positions of the normalized divisor in accordance with a bit position shift number defined by the number of leading successive bits of the input divisor having continuous "0" bit values and shifting the plural successive bits of the input dividend to respective and higher, corresponding bit positions of the relatively normalized dividend by a dividend bit position shift number such that the difference between the divisor shift number and the dividend shift number is an integer multiple of "n";

means for calculating the difference between the number of bit positions defined by the divisor bit position shift number and the number of bit positions defined by the dividend bit position shift number and producing a corresponding bit position shift difference output; and means for storing the normalized divisor, the relatively normalized dividend, and the bit position shift number difference and for supplying same as simultaneous outputs for high radix division of the dividend by the divisor and whereby the digit number of the resulting quotient is also an integer multiple of "n", the division may be stopped at a predetermined digit position, and a desired remainder is produced simultaneously with the quotient.

2. A division device preprocessor as recited in claim 1, wherein the normalizing means further comprises:

means for counting the unit number, wherein a unit is defined as "n" bits, of leading bit positions for which the corresponding bits have continuous "0" bit values, for each of the input divisor and the input dividend and for storing the resultant counts respectively as a divisor unit number and a dividend unit number;

means for shifting plural successive bits of the input divisor by the input divisor unit number and for shifting plural successive bits of the input dividend by the dividend unit number and producing, as respective outputs, a first-shifted divisor and a first-shifted dividend;

means for counting the number of leading successive bit positions, having corresponding bits of continuous "0" bit values, of the first-shifted divisor and for producing and storing the count as a first-shifted divisor bit position shift number; and means for shifting the plural successive bits of the first-shifted divisor by the first-shifted divisor bit position shift number and for shifting plural successive bits of the first-shifted dividend by the first-shifted divisor bit position shift number and thereby producing the normalized divisor and the relatively normalized dividend and supplying same to the storing means.

3. A division device preprocessor for preprocessing a divisor and a dividend to be subjected to high radix division capable of producing a partial quotient of "n" bits (n≧2) at one time, the divisor and the dividend each being expressed as a binary number of plural successive bits in corresponding, plural successive bit positions, each bit having either a "0" or a "1" bit value, and thus the divisor and the dividend each including binary numbers having a number of leading bit positions, including one or more bit positions, in which the corresponding, leading successive bits have continuous "0" bit values, comprising:

a first counter which counts the unit number, wherein a unit is defined as "n" bits, of leading bit positions for which the corresponding bits have continuous "0" bit values, for each of the input divisor and the input dividend, individually, and produces, as the corresponding outputs thereof, an input divisor unit number and an input dividend unit number;

a first shifter which shifts the plural successive bits, of the corresponding successive bit positions, respectively of the input divisor and the input dividend, to respective and higher, corresponding bit positions in accordance with the number of bit positions represented by the input divisor unit number and the input dividend unit number and produces, as respective outputs thereof, a first-shifted divisor and a first-shifted dividend;

a second counter which counts the number of leading successive bit positions, having corresponding bits of continuous "0" bit values, of the first-shifted divisor and produces, as a corresponding output thereof, a first-shifted divisor bit shift number;

a second shifter which shifts the plural successive bits of the first-shifted divisor by the first-shifted divisor bit shift number and which shifts the plural successive bits of the first-shifted dividend by the first-shifted divisor bit shift number and thereby produces, as respective outputs thereof, a normalized divisor and a relatively normalized dividend, the relatively normalized dividend being normalized relatively to the normalized divisor; and the division device preprocessor produces, as simultaneous outputs for high radix division, the normalized divisor, the relatively normalized dividend and the bit position shift number difference and whereby, upon completion of high radix division, the digit number of the resulting quotient is also an integer multiple of "n", the division may be stopped at a predetermined digit position, and a desired remainder is produced simultaneously with the quotient.

4. A division device preprocessor as recited in claim 3, further comprising:

a latch which stores the first-shifted divisor bit shift number; and a selector which selectively supplies the first-shifted divisor bit shift number from the second counter to the second shifter, and which is employed by the second shifter for shifting the plural successive bits of the first-shifted divisor, and which selectively supplies the first-shifted divisor bit shift number from the latch to the second shifter, and which is employed by the second shifter for shifting the plural successive bits of the first-shifted dividend.

5. A division device preprocessor for preprocessing a divisor and a dividend to be subjected to high radix division capable of producing a partial quotient of "n" bits (n≧2) at one time, the divisor and the dividend each being expressed as a binary number of plural successive bits in corresponding, plural successive bit positions, each bit having either a "0" or a "1" bit value and thus the divisor and the dividend each including binary numbers having a number of leading bit positions including one or more bit positions in which the corresponding, leading successive bits have continuous "0" bit values, comprising:

a first selector which selects, in sequence, the divisor and the dividend and selectively provides, in sequence, the selected divisor and the selected dividend as sequential outputs thereof;

a first zero counter which receives the sequential outputs of the first selector and which counts, in units of "n" bits, the unit number of leading successive bits having continuous "0" bit values, of the sequentially selected divisor and dividend and which produces, as sequential outputs thereof, a unit number count corresponding to the divisor and the unit number count corresponding to the dividend;

a first shifter which receives, in sequence, the sequential outputs of the first selector and the sequential outputs of the first zero counter and which, in sequence, shifts the respective binary bits of the divisor and shifts the binary bits of the dividend, each thereof by a number of bit positions determined by (the corresponding unit number count)×("n" bits) and produces, as sequential outputs thereof, respectively, a first-shifted divisor and a first-shifted dividend;

a second counter which counts the number of the continuous and leading "0" bits of the first-shifted divisor and produces a corresponding bit number count;

a latch which receives and stores the bit number count corresponding to the first-shifted divisor;

a second selector which selects, in sequence, first, the bit number count corresponding to the first-shifted divisor produced at the output of the second counter and, second, the bit number count corresponding to the divisor and stored in the latch;

a second shifter which, in sequence, first, receives the first-shifted divisor comprising the first of the sequential outputs of the first shifter and the bit number count output of the second counter, as selected first by the second selector from the output of the second counter, and which shifts the received, first-shifted divisor by the received and first selected bit number count of the output of the second counter and thereby produces a normalized divisor as a first output thereof and, second, receives the first-shifted dividend comprising the second of the sequential outputs of the first shifter and the bit number count of the second counter, as selected second by the second selector from the latch, and shifts the first-shifted dividend by the received bit number count selected second by the second selector from the latch and thereby produces a relatively normalized divisor as a second output thereof; and the preprocessor thereby normalizing the divisor and the relatively normalized dividend such that the difference between the respective numbers of bit position shifts of the divisor and the dividend is always an integer multiple of "n", the digit number of the quotient is always an integer multiple of "n", the division operation concludes with a predetermined bit position, and a desired remainder is produced simultaneously with the quotient.

* * * * *

UNITED STATES PATENT AND TRADEMARK OFFICE
CERTIFICATE OF CORRECTION

PATENT NO. : 5,339,267
DATED : August 16, 1994
INVENTOR(S) : ITO

It is certified that error appears in the above-indentified patent and that said Letters Patent is hereby corrected as shown below:

On the title page item [56], change "Masayuki" to --Ikeda--; and under

OTHER PUBLICATIONS, second reference, line 1, change "Afte" to --After--.

Col. 3, line 3, change " "0111÷ +"0011" " to --"0111" ÷ "0011"--;
line 8, after "are" change "say" to --saY--.

Signed and Sealed this

Twenty-ninth Day of November, 1994

Attest:

BRUCE LEHMAN

Attesting Officer — Commissioner of Patents and Trademarks